United States Patent [19]

Tazi et al.

[11] Patent Number: 4,939,198
[45] Date of Patent: Jul. 3, 1990

[54] SOLUTION FEED, SOLUTION POLYMERIZATION PROCESS FOR PRODUCTION OF COPOLYMERS OF MALEIC ANHYDRIDE AND AN ALKYLVINYL ETHER HAVING LOW VISCOSITIES AND HIGH SOLIDS CONTENT

[75] Inventors: Mohammed Tazi, Wayne; Nikhil Kundel, Piscataway, both of N.J.

[73] Assignee: GAF Chemicals Corporation, Wayne, N.J.

[21] Appl. No.: 334,404

[22] Filed: Apr. 7, 1989

[51] Int. Cl.$^5$ .................... C08F 2/06; C08F 222/16
[52] U.S. Cl. .................................... 524/379; 526/79; 526/87; 526/271
[58] Field of Search .................... 526/79, 271, 87; 524/379

[56] References Cited

U.S. PATENT DOCUMENTS

| | | | |
|---|---|---|---|
| 2,694,698 | 11/1954 | Grosser | 526/77 |
| 3,178,395 | 4/1965 | Muskat | 526/79 |
| 3,956,244 | 5/1976 | Carpenter et al. | 526/79 |

FOREIGN PATENT DOCUMENTS 310079  4/1989  European Pat. Off. .

Primary Examiner—Joseph L. Schofer
Assistant Examiner—Tom Weber
Attorney, Agent, or Firm—Walter Katz; Marilyn J. Maue; Joshua J. Ward

[57] ABSTRACT

A solution feed, solution polymerization method for making copolymers of maleic anhydride and an alkyl vinyl ether is described. In this process, maleic anhydride in a functional organic solvent is fed into a reactor precharged with an alkyl vinyl ether. The reactant solution is polymerized in the presence of a free radical initiator to provide copolymers in solution having low viscosities and high solids content.

13 Claims, No Drawings

SOLUTION FEED, SOLUTION POLYMERIZATION PROCESS FOR PRODUCTION OF COPOLYMERS OF MALEIC ANHYDRIDE AND AN ALKYLVINYL ETHER HAVING LOW VISCOSITIES AND HIGH SOLIDS CONTENT

BACKGROUND OF THE INVENTION

1. Field of the Invention

This invention relates to a process for making copolymers of maleic anhydride and an alkyl vinyl ether, and, particularly, to a solution feed solution polymerization process for making such copolymers having very low viscosities and high solids content, which are advantageous for use in non-aerosol, pump spray cosmetic products.

2. Description of the Prior Art

Several methods are known for preparing copolymers of maleic anhydride (MA) and an alkyl vinyl ether, e.g. methyl vinyl ether (MVE). For example, it is known:

(1) To react a charge of MA and a large excess of MVE in a pressure reactor. However, this method is disadvantageous because considerable heat is evolved during the polymerization, and it is difficult to remove this internally generated heat effectively. Furthermore, in the presence of a large excess of MVE, only high viscosity polymers are formed.

(2) Another method involves feeding molten MA into a reactor precharged with excess MVE. However, since the MA-MVE copolymerization is a spontaneous reaction, this method generates a non-homogeneous system in which localized polymerization can occur leading to formation of homopolymers of MVE.

(3) Another technique involves feeding molten MA into a reactor precharged with MVE dissolved in a solvent. This method avoids the necessity of a large excess of MVE; however, it is very difficult to monitor the feed rate of molten MA into the reactor, and, accordingly, as in process (2), localized polymerization occurs with the resultant formation of undesirable by-products.

(4) In yet another method, MVE is fed into a reactor precharged with MA dissolved in a solvent. Unfortunately, this procedure does not provide very low viscosity MA-MVE copolymers having a high solids content, which properties are required for use in non-aerosol, pump spray cosmetic products.

OBJECTS AND FEATURES OF THE INVENTION

Accordingly, it is an object of this invention to provide an improved process for preparing copolymers of maleic anhydride and alkyl vinyl ethers.

Another object herein is to provide such a copolymer product which has very low intrinsic viscosities.

Still another object herein is to provide a solution feed, solution polymerization method of making MA-MVE copolymers which avoids the difficulties and limitations associated with prior processes.

Specifically, it is intended herein that the method avoids feeding molten MA; of generating an excessive amount of heat internally; of requiring a large excess of MVE; and of process conditions which promote localized polymerization leading to formation of homopolymers of MVE and other undesirable by-products.

A further object of this invention is to provide a process capable of producing very low viscosity MA-MVE copolymers in solution having a high solids content.

Still another object herein is to provide an MA-MVE copolymer product characterized by the substantial absence of high boiling by-products which may be generated by decomposition of free radical polymerization initiators.

A particular object herein is to provide a solution feed, solution polymerization process using an initiator which will generate by-products characteristic of the solvent itself and/or low boiling hydrocarbons.

Among the other objects herein is to provide a benzene-free solution feed, solution polymerization process in which the MA-MVE copolymer product appears in solution and can be readily esterified in situ to form a half-ester derivative having a very low viscosity and a high solids content.

A feature of the invention is the provision of a benzene-free solution feed process for solution polymerization of MA and MVE in which MA is dissolved in an organic solvent and is fed into a reactor precharged with MVE.

Another feature herein is the use of a free radical initiator whose decomposition products include the solvent used and low boiling hydrocarbons.

Still another feature herein is the provision of an MA-MVE copolymer product having very low intrinsic viscosities, and particularly, less than 0.3, as measured in a 1% solution in 2-butanone, and a high solids content, preferably at least 35%, and which can be made readily into the corresponding half-ester compound with a viscosity of 60 centistokes or less, which is suitable for non-aerosol, pump hairspray use.

These and other objects and features of the invention will be made apparent from the following description of the invention.

SUMMARY OF THE INVENTION

What is described herein is a solution feed, solution polymerization process for making copolymers of maleic anhydride and an alkyl vinyl ether. The process of the invention is characterized by precharging an alkyl vinyl ether, preferably in a solvent, into a reactor and feeding therein a solution of maleic anhydride in a functional organic solvent.

The solvent is selected to provide a suitable solution of both reactants and the copolymer product at a predetermined solvent level, and to facilitate formation of low viscosity copolymer products. Functional organic solvents, such as ketones, esters and ethers are preferred, as for example, acetone, ethyl acetate and tetrahydrofuran.

The copolymer product obtained herein is benzene-free, of very low intrinsic viscosity, e.g. 0.3 or less, and of a high solids content, e.g. at least 35 wt %, and preferably 50 wt %, or more, in solution.

DETAILED DESCRIPTION OF THE INVENTION

The solution feed, solution polymerization method of the invention is based upon feeding maleic anhydride as a solution in a selected solvent into a reactor precharged with an alkyl vinyl ether. Polymerization is effected in solution in the presence of a suitable free radical initiator.

In the preferred embodiment of the invention, the solvent is acetone. At 25° C., approximately 227 g. of maleic anhydride can be dissolved in 1100 g. of acetone. The solution of maleic anhydride in acetone promotes a homogeneous reaction system characterized by a large diffusion distance between polymeric molecules. Preferably, the MA: acetone weight ratio in the feed solution is about 1:1 to 1:2, and, most preferably, about 10

The MA-acetone solution is fed into a reactor precharged with $C_1$-$C_5$ vinyl ether, e.g. vinyl ether, alone, or preferably in a small amount of the solvent. The precharged ether solution generally contains only a 10% or less molar excess of the ether compound over the stoichiometric amount required for copolymerization with MA to produce the MA-MVE copolymer.

The solvent is present in the system in an amount sufficient to keep both reactants and copolymer products in solution during the polymerization. Preferably the solvent also facilitates formation of low viscosity, high solids content copolymers.

The free radical initiator for the polymerization reaction can be any known to effect polymerization between MA and MVE, e.g. peroxy esters, acyl peroxides, alkyl peroxides, and the like. Preferably, however, the free radical initiator in this process is a peroxy ester e.g. t-amylperoxy pivalate (TAPP) (Lupersol 554 M75-Pennwalt Co.). The TAPP initiator is a liquid which will undergo decomposition to leave only acetone and low boiling hydrocarbons, as by-products which are easily separated from the copolymer reaction product.

The free radical initiator can be introduced into the reactor in one shot, but preferably, it is admitted in increments, and most preferably, while feeding the MA solution into the reactor. The initiator solution suitably comprises about 1-10%, preferably 5% by wt., based on the amount of MA present.

The precharged reactor is maintained at a temperature of about 55°-85° C., and preferably, at about 75° C., while both the initiator and the MA feed solution is introduced. Preferably, the MA solution is fed into the reactor about a 2-6 hour period and preferably, over 4 hours.

After introduction of the initiator and MA solution into the reactor precharged with MVE in acetone, the reaction solution is held at about 75° C. for 1 hour to complete solution polymerization of the monomers.

The reactor then is cooled to about 25°-30° C., and excess MVE is removed. The remaining acetone solution containing the copolymer reaction product then is discharged from the reactor.

The reaction product is the copolymer of MA and MVE in acetone solution. The intrinsic viscosities of the copolymers obtained are below 0.3, as determined by measurement in 2-butanone solution (1% copolymer solution).

Solution polymerization provides a substantially quantitative yield of the copolymer in the form of a clear solution. The solid content of the product is generally at least 35%, and usually is 50%, or more.

If desired, the acetone and low boiling hydrocarbon by-products can be separated from the copolymer by distillation, stripping, or by addition of a non-solvent for the copolymer. However, it is convenient to half-esterify the copolymer solution directly with an alkanol, e.g. ethanol or butanol, to form the half-ester compound of MA-MVE in ethanol. The acetone and low boiling hydrocarbons then can be removed readily from the higher boiling alkanol. These products are suitable for use in non-aerosol, pump hairspray products.

A typical half-ester compound has a viscosity of about 60 centistokes or less, and a solids content of about 35-50%.

The process of the invention will now be described with reference to the following working examples of the invention.

EXAMPLE 1

SOLUTION FEED, SOLUTION POLYMERIZATION PROCESS FOR MAKING COPOLYMERS OF MA AND MVE

Procedure

In a 1-liter pressure reactor:
1. Dissolve 98 g. of MA into 147 g. of acetone (1:1.5 solution);
2. Charge the freshly prepared solution into a syringe pump;
3. Charge 143 g. of acetone into the reactor;
4. Charge 63.8 g. of MVE into the reactor (10% mole excess MVE);
5. Heat the reactor until the temperature of the charge reaches 70° C.;
6. When the temperature stabilizes at 70° C., take this as time 0; at time 0:
    (a) Introduce the initiator, e.g. 3.92 g. of t-amylperoxy pivalate, (4% based on MA) in 20 ml of the MA solution in one shot;
    (b) Continuously feed the rest of the MA solution over a 4-hour period;
at time 240 min.
    (c) Hold the reaction mixture at 70° C. for 1 hour;
at time 300 min.
    (d) Cool the reactor to 25°-30° C.; remove excess MVE and collect it; and
    (e) Discharge the reaction product as a solution.

EXAMPLE 2

In this example, a commercial solution of the initiator is added incrementally over the entire reaction period. Similar results are obtained.

EXAMPLE 3

Copolymer Reaction Product

The copolymer reaction product is characterized by being:
(a) Benzene-free;
(b) A solution in acetone and low boiling hydrocarbons;
(c) A solids content of 35-50%;
(d) An intrinsic viscosity of less than 0.3 (measured as a 1% solution in 2-butanone);
(e) Present as a clear solution in quantitative yield;
(f) Readily esterified with ethanol by solvent interchange with removal of acetone to provide the half-ester MA-MVE product in ethanol having a specific viscosity of 60 centistokes or less and a solids content of up to 50%.

While the invention has been described with reference to certain embodiments thereof, it will be understood that changes and modifications may be made which are within the skill of the art.

What is claimed is:

1. A solution feed, solution polymerization process for making half-ester copolymers of maleic anhydride and a $C_1$–$C_5$ alkyl vinyl ether having a predetermined low viscosity and high solids content which comprises:
   (a) precharging a reactor with a molar excess of an alkyl vinyl ether,
   (b) feeding maleic anhydride as a solution in acetone solvent into said precharged reactor,
   (c) solution copolymerizing said reactants at a temperature of about 55°–85° C. in the presence of a free radical initiator to form a substantially quantitative and clear solution of the copolymer in acetone, and
   (d) half-esterifying said copolymer with an alkanol with removal of acetone to form a solution of the half-ester copolymer in the alkanol having a specific viscosity of about 60 centistokes or less and a solids content of at least 35% by weight.

2. A method according to claim 1 wherein said initiator is a peroxy ester.

3. A method according to claim 2 wherein said initiator is a t-amylperoxy pivalate.

4. A method according to claim 1 wherein said alkyl vinyl ether is methyl vinyl ether.

5. A method according to claim 1 wherein said solution of maleic anhydride in acetone is present in a weight ratio of about 1:1 to 1:2.

6. A method according to claim 1 wherein the initiator is present in an amount of about 1–10% by weight, based on maleic anhydride.

7. A method according to claim 1 wherein the initiator is added in one shot or incrementally during the polymerization reaction.

8. A method according to claim 1 wherein the feed solution of maleic anhydride is introduced over a period of about 2–6 hours.

9. A method according to claim 1 wherein a molar excess of only 10% or less of alkyl vinyl ether is present.

10. A method according to claim 1 wherein said alkyl vinyl ether is present as a solution in said solvent.

11. A method according to claim 3 wherein the decomposition products of said initiator are acetone and low boiling hydrocarbons.

12. A method according to claim 1 wherein the polymerization reaction is substantially quantitative and the reaction product is a clear solution.

13. A method according to claim 1 wherein said weight ratio of maleic anhydride in acetone is about 1:1, said initiator level is about 5% by weight, and the reaction temperature is about 70° C.

* * * * *